(12) United States Patent
Alsultan

(10) Patent No.: US 8,981,197 B1
(45) Date of Patent: Mar. 17, 2015

(54) CIRCULAR COMPUTER INTERFACE

(71) Applicant: Tareq J. S. M. Alsultan, Al-Bedae (KW)

(72) Inventor: Tareq J. S. M. Alsultan, Al-Bedae (KW)

(*) Notice: Subject to any disclaimer, the term of this patent is extended or adjusted under 35 U.S.C. 154(b) by 49 days.

(21) Appl. No.: 14/109,751

(22) Filed: Dec. 17, 2013

(51) Int. Cl.
*G09B 13/00* (2006.01)
*G09B 15/02* (2006.01)

(52) U.S. Cl.
CPC .................................. *G09B 15/026* (2013.01)
USPC ...................................................... 84/477 R

(58) Field of Classification Search
CPC ...... G09B 15/00; G09B 15/02; G09B 15/001; G09B 19/00; G09B 5/062; G09B 7/02; G10H 1/0016; G10H 2220/015; G10H 1/0008; G10H 2210/091; G10H 1/342; G10H 2210/066; G10H 1/383; G10H 1/386
USPC ........ 84/470 R, 471 R, 472–476, 477 R, 478, 84/485 R
See application file for complete search history.

(56) References Cited

U.S. PATENT DOCUMENTS

| | | |
|---|---|---|
| 6,229,082 B1 | 5/2001 | Masias |
| 2006/0007130 A1 | 1/2006 | Mosley |
| 2007/0086825 A1 | 4/2007 | Min |
| 2011/0216006 A1 | 9/2011 | Litschel |
| 2012/0085221 A1 | 4/2012 | Willoughby |

FOREIGN PATENT DOCUMENTS

| | | |
|---|---|---|
| CN | 101630506 A | 1/2010 |
| GB | 2 312 085 A | 10/1997 |

*Primary Examiner* — Kimberly Lockett
(74) *Attorney, Agent, or Firm* — Richard C. Litman

(57) ABSTRACT

The circular computer interface is a keypad, keyboard or the like, allowing the user to easily actuate, or type with, all keys using only a single hand. The circular computer interface includes a cylindrical housing and a circular keypad mounted to the upper end of the cylindrical housing. The circular keypad includes a plurality of keys, where each key is contoured as a sector of a circle. To use the keypad for playing music, the keypad includes twelve such keys, with each key representing a respective tone of a chromatic musical scale, allowing the keypad to be played directly in the arrangement of the musical circle of fifths. In an alternative embodiment, the circular keypad is divided into a plurality of sets keys, where each set is arranged as a sector of the circle, and each set includes a plurality of radially arranged keys.

1 Claim, 7 Drawing Sheets

CIRCULAR COMPUTER INTERFACE

BACKGROUND OF THE INVENTION

1. Field of the Invention

The present invention relates generally to computer interfaces, such as keypads, keyboards and the like, and particularly to a computer interface having a circular arrangement of keys.

2. Description of the Related Art

In music theory, the circle of fifths (or circle of fourths) is a visual representation of the relationships among the 12 tones of the chromatic scale, their corresponding key signatures, and the associated major and minor keys. More specifically, it is a geometrical representation of relationships among the 12 pitch classes of the chromatic scale in pitch class space. FIG. 2 illustrates the conventional circle of fifths arrangement, showing major and minor keys. The term "fifth" defines an interval or mathematical ratio which is the closest and most consonant non-octave interval. The circle of fifths is a sequence of pitches or key tonalities, represented as a circle, in which the next pitch is found seven semitones higher than the last. Musicians and composers use the circle of fifths to understand and describe the musical relationships among some selection of those pitches. The circle's design is helpful in composing and harmonizing melodies, building chords, and modulating to different keys within a composition.

At the top of the circle, the key of C Major has no sharps or flats. Starting from the apex and proceeding clockwise by ascending fifths, the key of G has one sharp, the key of D has 2 sharps, and so on. Similarly, proceeding counterclockwise from the apex by descending fifths, the key of F has one flat, the key of B♭ has 2 flats, and so on. At the bottom of the circle, the sharp and flat keys overlap, showing pairs of enharmonic key signatures.

Starting at any pitch, ascending by the interval of an equal tempered fifth, one passes all twelve tones clockwise, to return to the beginning pitch class. To pass the twelve tones counterclockwise, it is necessary to ascend by perfect fourths, rather than fifths. FIG. 3 shows the circle of fifths drawn within the chromatic circle as a star dodecagram. The circle of fifths is closely related to the chromatic circle, which also arranges the twelve equal-tempered pitch classes in a circular ordering. A key difference between the two circles is that the chromatic circle can be understood as a continuous space where every point on the circle corresponds to a conceivable pitch class, and every conceivable pitch class corresponds to a point on the circle. By contrast, the circle of fifths is fundamentally a discrete structure, and there is no obvious way to assign pitch classes to each of its points. In this sense, the two circles are mathematically quite different.

However, the twelve equal-tempered pitch classes can be represented by the cyclic group of order twelve, or equivalently, the residue classes modulo twelve, $Z/12Z$. The group $Z_{12}$ has four generators, which can be identified with the ascending and descending semitones and the ascending and descending perfect fifths. The semitonal generator gives rise to the chromatic circle while the perfect fifth gives rise to the circle of fifths. The circle of fifths, or fourths, can be mapped from the chromatic scale by multiplication, and vice versa. To map between the circle of fifths and the chromatic scale (in integer notation) multiply by 7 (M7), and for the circle of fourths multiply by 5 (P5).

A simple way to see the musical interval known as a fifth is by looking at a piano keyboard, and, starting at any key, counting seven keys to the right (both black and white) to get to the next note on the circle shown in FIG. 2. Seven half steps, the distance from the first to the eighth key on a piano is a "perfect fifth", called "perfect" because it is neither major nor minor, but applies to both major and minor scales and chords, and a "fifth" because though it is a distance of seven semitones on a keyboard, it is a distance of five steps within a major or minor scale. A simple way to hear the relationship between these notes is by playing them on a piano keyboard. If you traverse the circle of fifths backwards, the notes will feel as though they fall into each other. This aural relationship is what the mathematics describes. Despite the simplicity and usefulness of the circle of fifths (and its related chromatic scale), one must perform mental and mathematical operations, as described above, in order to translate the circle of fifths onto an actual musical instrument. It would therefore be desirable to be able to provide an arrangement of keys which directly translates to the circle of fifths, and vice versa.

Thus, a circular computer interface addressing the aforementioned problems is desired.

SUMMARY OF THE INVENTION

The circular computer interface is a keypad, keyboard or the like, allowing the user to easily actuate, or type with, all keys using only a single hand. The circular computer interface includes a cylindrical housing, having opposed upper and lower ends, with the lower end thereof serving as a base for mounting on any suitable support surface, such as a desk or the like, and a circular keypad mounted to the upper end of the cylindrical housing. The circular keypad includes a plurality of keys, where each key is contoured as a sector of a circle. For use with a computer programmed to play music, with a computerized musical instrument or the like, the keypad desirably includes twelve such keys, with each key representing a respective tone of a chromatic musical scale, thus allowing the keypad to be played directly in the arrangement of the musical circle of fifths.

In an alternative embodiment, the circular keypad is divided into a plurality of sets of keys, where each set is arranged as a sector of the circle, and each set includes a plurality of radially arranged keys. In this embodiment, using sets each having three or four keys, the entire alphanumeric arrangement of a conventional computer keyboard can be integrated into the circular keypad, including additional computer function keys.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
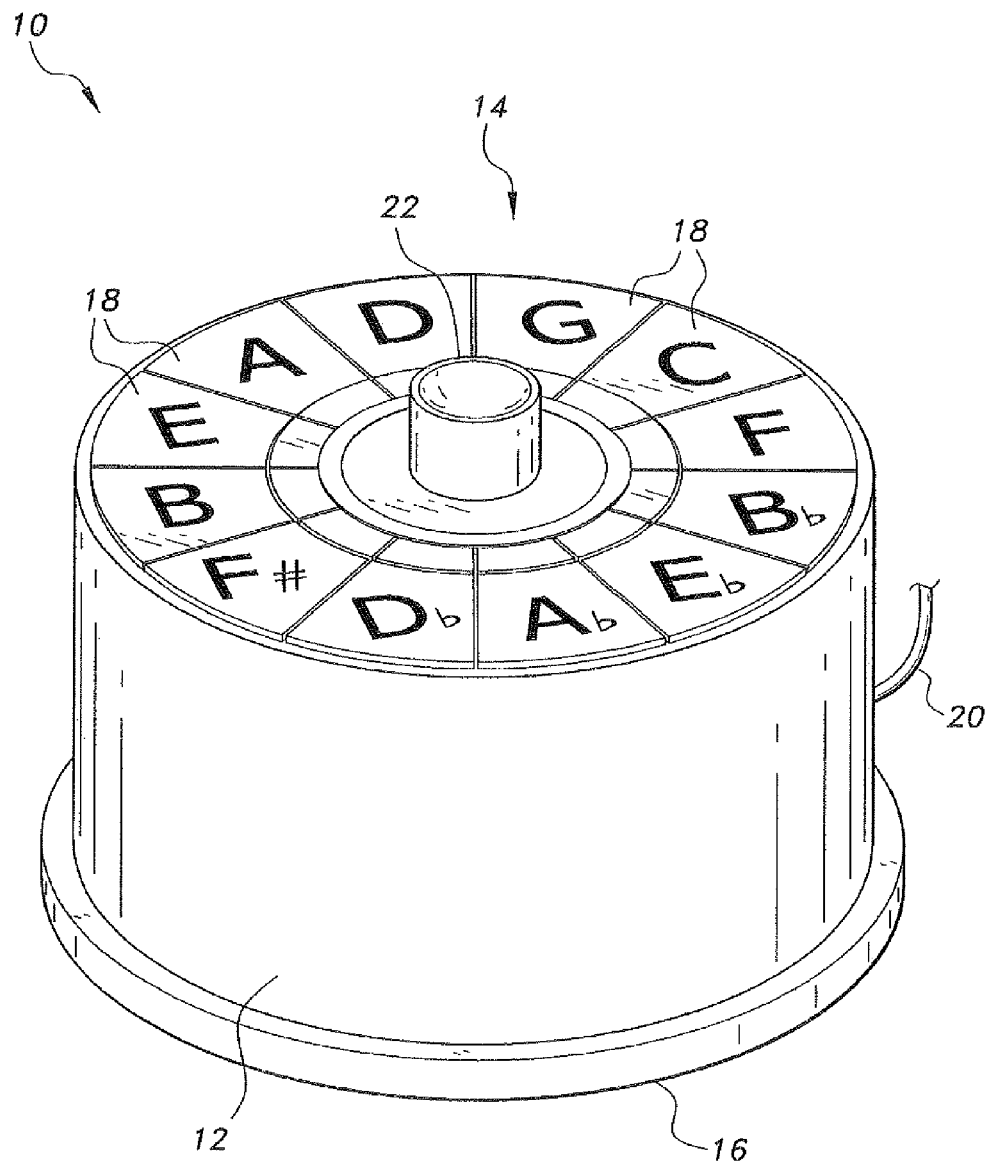
FIG. 1 is a perspective view of a circular computer interface according to the present invention.
Figure 2:
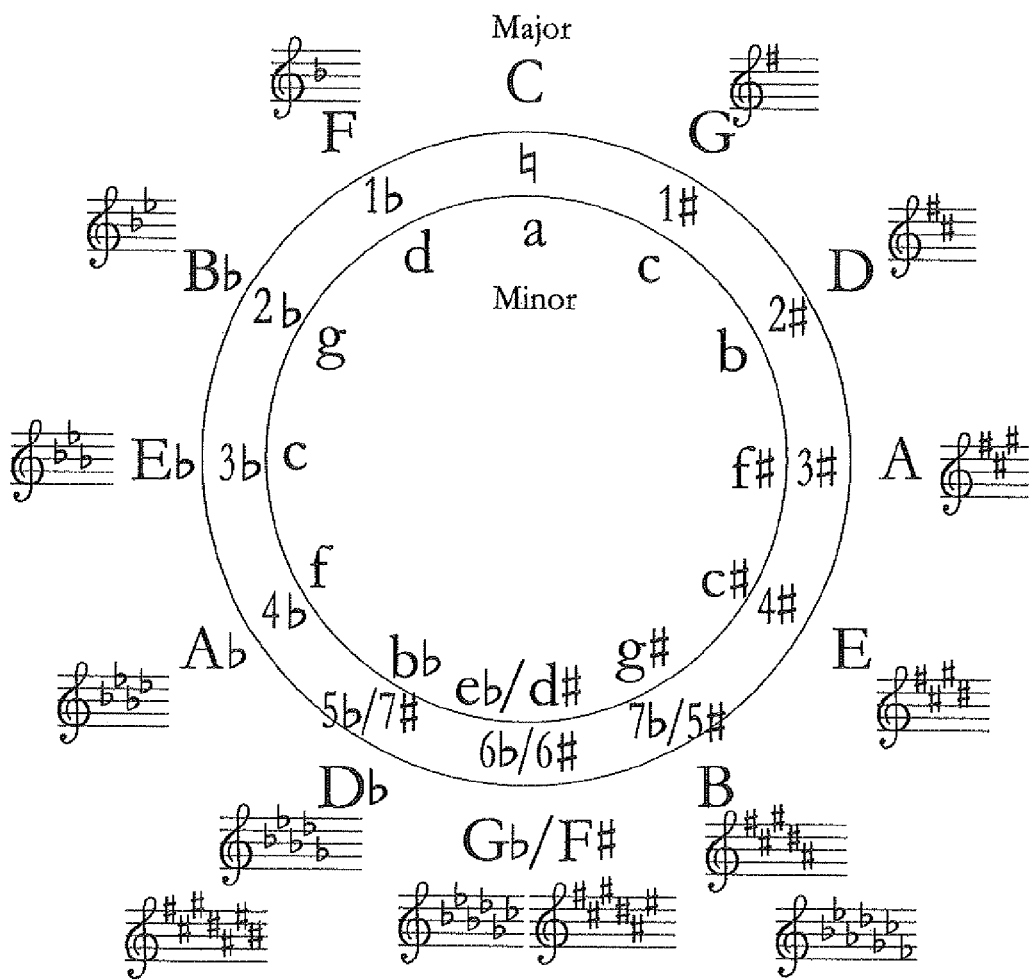
FIG. 2 diagrammatically illustrates the musical circle of fifths.
Figure 3:
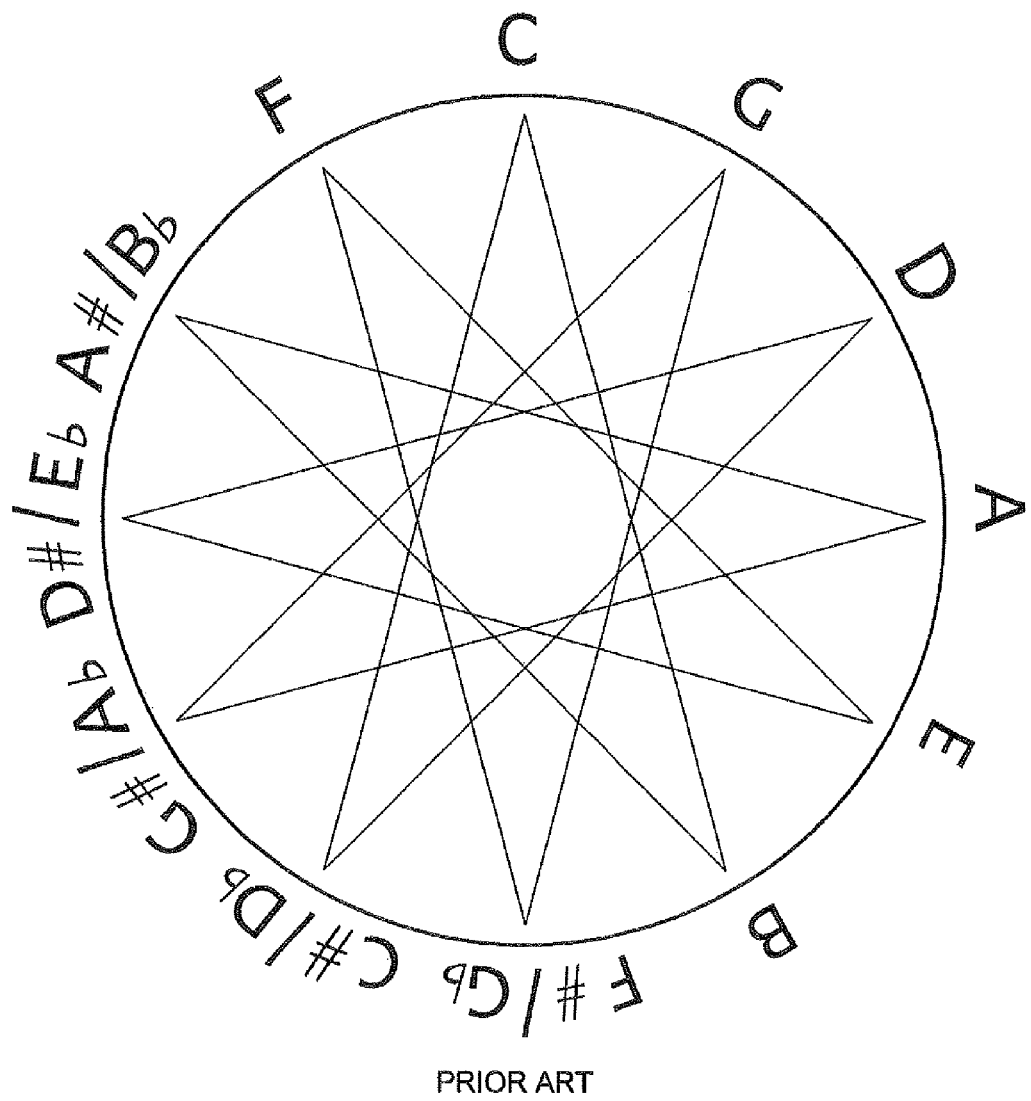
FIG. 3 illustrates the circle of fifths of FIG. 2 embedded within the musical chromatic circle as a star dodecagram.

The circular computer interface 10 is a keypad, keyboard or the like, allowing the user to easily actuate, or type with, all keys using only a single hand. As shown in FIG. 1, the circular computer interface 10 includes a cylindrical housing 12, having opposed upper and lower ends, with the lower end thereof serving as a base 16 for mounting on any suitable support surface, such as a desk or the like, and a circular keypad 14 mounted to the upper end of the cylindrical housing 12. A wire 20, cable or the like is provided for attachment to an external computer, computerized musical instrument or the like.

It should be understood that the circular computer interface 10 includes any suitable circuitry, interfaces, etc., as are well known in the field of computer keyboards, keypads and the like, for integration with a computer, computer system, computerized musical instrument or the like. It should be further understood that the circular computer interface 10 is not limited to usage with any one type of computer, computerized instrument or the like. The circular computer interface 10 is shown as having a wired interface having the wire 20 for coupling to a computer any suitable type of plug or the like.

When the circular computer interface 10 is coupled to a computer, the keypad 14 communicates with the computer by a keypad controller and supporting circuitry located within the computer to receive the information generated by the computer interface 10. Implementation of a wired interface is well known to those skilled in the art. Computer interface 10 can alternatively be coupled to a computer by a wireless interface (not shown). Such wireless interfaces can be implemented in either the infrared or radio frequency spectrum. Implementation of a wireless interface via any one of these frequency spectrums is well known to those skilled in the art.

Figure 4:
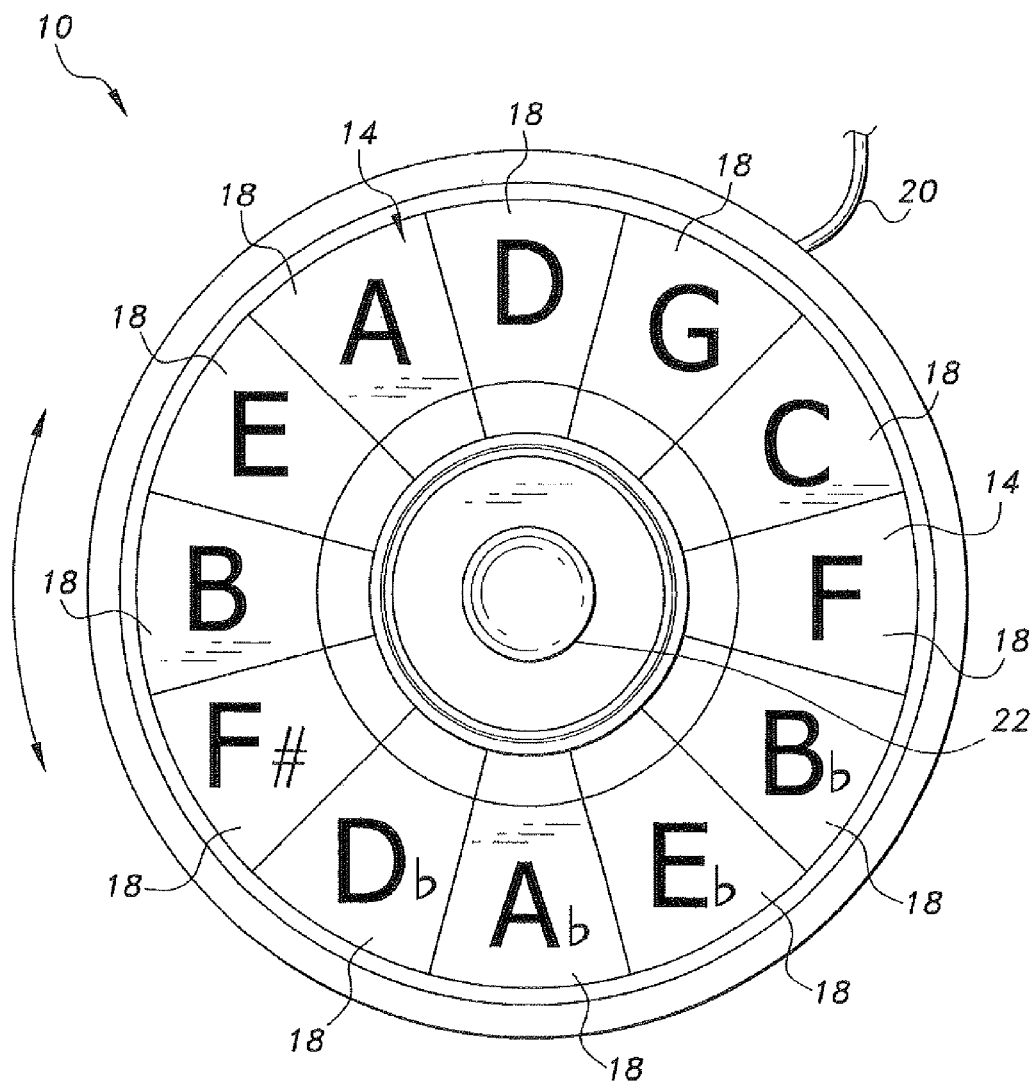
FIG. 4 is a top view of the circular computer interface according to the present invention.

As best shown in FIG. 4, the circular keypad 14 includes a plurality of keys 18, where each key 18 is contoured as a sector of a circle. For use with a computer programmed to play music, such as through a speaker, or to display a musical representation, such as on a display, or such as used with a computerized musical instrument or the like, the keypad 14 desirably includes twelve such keys 18, with each key 18 representing a respective tone of a chromatic musical scale, thus allowing the keypad 14 to be played directly in the arrangement of the musical circle of fifths.

It should, however, be understood that any suitable number of keys 18 can be provided, dependent upon the particular needs and desires of the user. Additionally, in FIG. 4, each key 18 is shown imprinted with indicia represented of a musical note. It should be understood that each key 18 can be identified with any desired character, dependent upon the desired function of the circular computer interface 10. Further, keypad 14 is desirably rotatable about central axis 22 (which can be an axle or the like), allowing the user to easily rotate the keypad 14 to access any desired key or keys 18 without having to reposition his or her hand.

Figure 5A:
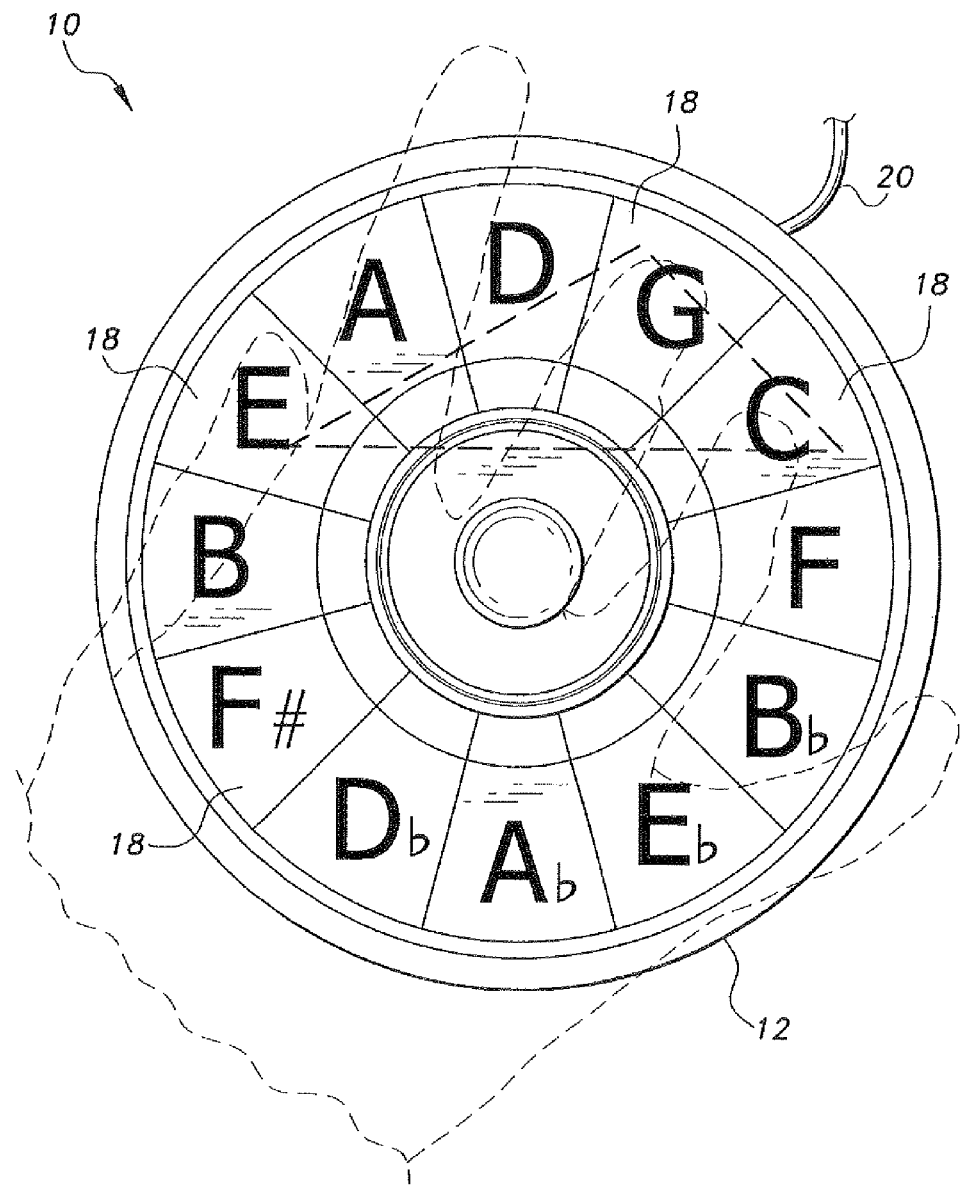
FIG. 5A is a top view of the circular computer interface being used to produce a major musical chord.
Figure 5B:
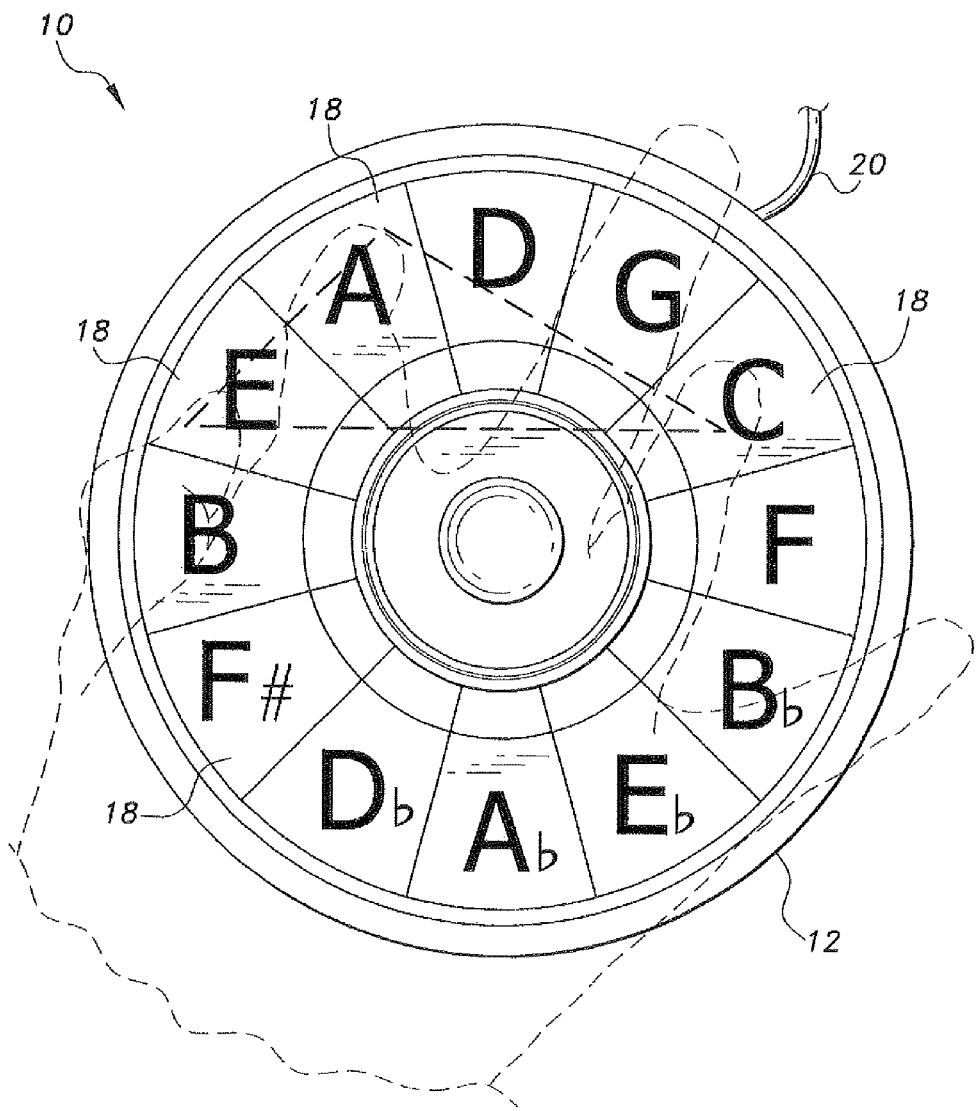
FIG. 5B is a top view of the circular computer interface being used to produce a minor musical chord.

FIGS. 5A and 5B illustrate the circular computer interface 10 being used to produce major and minor musical chords, respectively. As shown in FIG. 5A, the user can easily produce a major chord with only one hand, touching the keys 18 representing the notes E, G and C. This arrangement is illustrated by the dashed-line triangle in FIG. 5A. In order to produce the corresponding minor chord, the user can easily rearrange his fingers, as in FIG. 5B, and the user can easily produce the corresponding minor chord with only one hand, such as by touching the keys 18 representing the notes E, A and C, with the finger arrangement also being shown by the dashed-line triangle in FIG. 5B, which can be a mirror image, or a reflection of, the triangle of FIG. 5A, for example. Also, for example, other geometric shapes, or arrangements, can also be used to represent or form a chord or a corresponding chord on the circular computer interface 10, and, as such, should not be construed in a limiting sense.

Figure 6:
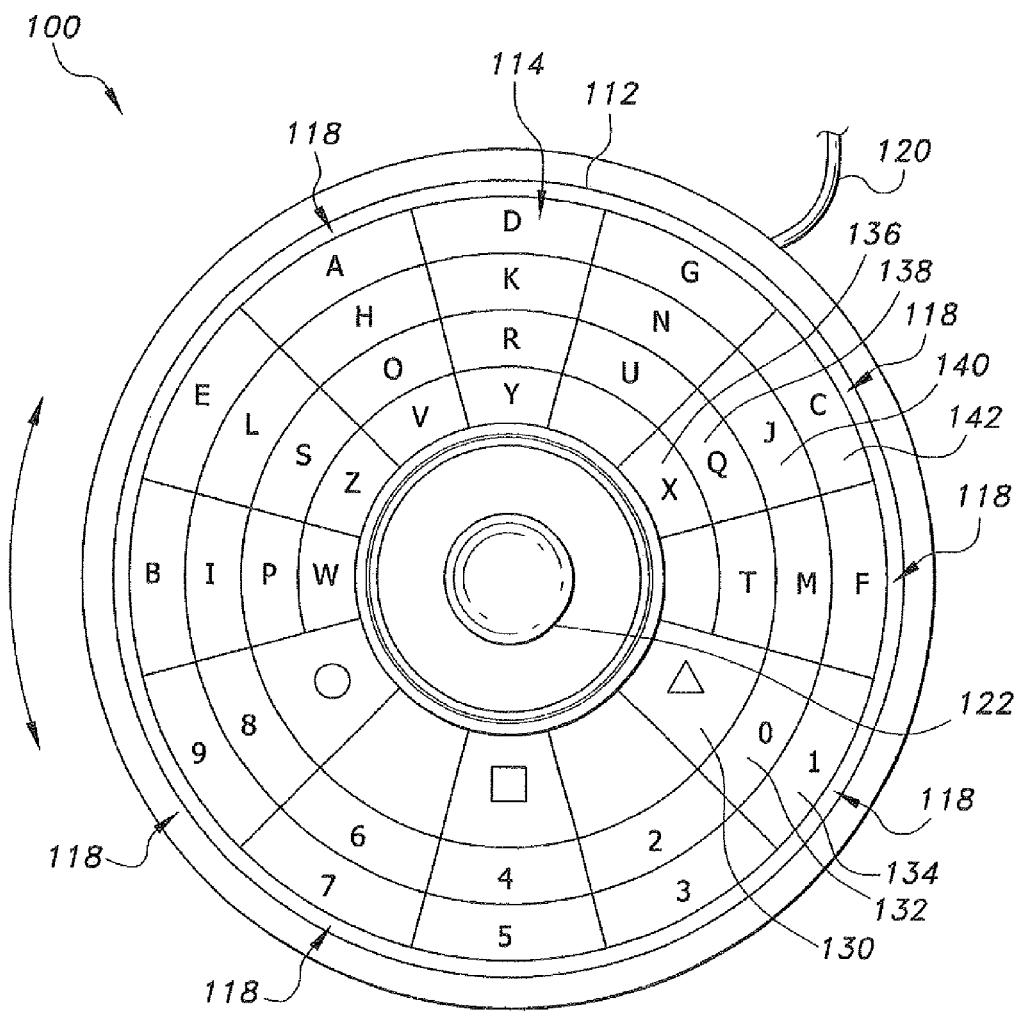
FIG. 6 is a top view of an alternative embodiment of the circular computer interface.

In the alternative embodiment of FIG. 6, the circular computer interface 100 includes a computer keypad 114 rotatably mounted to a cylindrical housing 112 about a central axis 122, similar to the circular computer interface 10 described above. The circular keypad 114 is divided into a plurality of sets of keys 118, where each set 118 is arranged as a sector of the circle, and each set includes a plurality of radially arranged keys.

In the embodiment of the circular computer interface 100 illustrated in FIG. 6, using sets each having three or four keys, the entire alphanumeric arrangement of a conventional computer keyboard can be integrated into the circular keypad 114, including additional computer function keys. In an arrangement of the illustrated embodiment of FIG. 6, one set 118, for example, can include three such keys, with one key 130 representing a function key, and keys 132, 134 representing numbers. Another exemplary set 118 can include four keys, such as keys 136, 138, 140 and 142, each representing a radial arrangement of letters. Any desired additional keys, such as a spacebar, shift key, etc. can be integrated into this design in a corresponding set 118.

As in the embodiment of the circular computer interface 10, it should be understood that the particular indicia shown in FIG. 6 are shown for exemplary purposes only, and that any characters or other indicia can be utilized, for example, and should not be construed in a limiting sense. Additionally, other indicia, such as colors or other symbols, can be used to represent various particular functions, relations or representations, in other alternate implementations or embodiments, such as for usage as an interface for a lighting system or the like, or to represent corresponding signs of a horoscope, for example, in other arrangements of embodiments of a circular computer interface for example.

It is to be understood that the present invention is not limited to the embodiments described above, but encompasses any and all embodiments within the scope of the following claims.

I claim:
1. An apparatus for displaying relationships between musical notes, comprising:
a cylindrical housing having a vertical axis, opposed upper and lower ends;
wherein the upper end has a planar surface defining a circle; and
a single planar circular keypad horizontally rotatably mounted to the upper end of the cylindrical housing about the vertical axis, wherein the circular keypad is divided into twelve equal radial sectors representing the twelve tones of a chromatic musical scale, each of the sectors representing respective notes, sharps, and flats of the twelve tones of the musical scale in sequential clockwise order: C, F, Bb, Eb, Ab, Db, F#, B, E, A, D, G, whereby a user can produce major or minor chords with the fingers of a single hand and form a geometric shape representing the formed chord.

\* \* \* \* \*